(12) United States Patent
Carter et al.

(10) Patent No.: US 9,122,533 B2
(45) Date of Patent: Sep. 1, 2015

(54) SYSTEM AND METHOD FOR REDUCING CLOUD IP ADDRESS UTILIZATION USING A DISTRIBUTOR REGISTRY

(75) Inventors: Stephen R. Carter, Spanish Fork, UT (US); Carolyn Bennion McClain, Springville, UT (US); Jared Patrick Allen, Sandy, UT (US); Dale Robert Olds, Draper, UT (US); Lloyd Leon Burch, Payson, UT (US)

(73) Assignee: NOVELL, INC., Provo, UT (US)

( * ) Notice: Subject to any disclaimer, the term of this patent is extended or adjusted under 35 U.S.C. 154(b) by 862 days.

(21) Appl. No.: 12/613,112

(22) Filed: Nov. 5, 2009

(65) Prior Publication Data

US 2010/0235526 A1 Sep. 16, 2010

Related U.S. Application Data

(60) Provisional application No. 61/160,030, filed on Mar. 13, 2009.

(51) Int. Cl.

| G06F 15/16 | (2006.01) |
| --- | --- |
| G06F 9/50 | (2006.01) |
| H04L 12/713 | (2013.01) |
| H04L 29/08 | (2006.01) |
| G06F 15/173 | (2006.01) |
| H04L 29/12 | (2006.01) |

(52) U.S. Cl.
CPC .............. *G06F 9/505* (2013.01); *H04L 45/586* (2013.01); *H04L 67/10* (2013.01); *H04L 29/12367* (2013.01); *H04L 61/2514* (2013.01)

(58) Field of Classification Search
CPC ....... G06F 9/505; H04L 67/10; H04L 45/586; H04L 29/12367; H04L 61/2514

USPC .......................................................... 709/229
See application file for complete search history.

(56) References Cited

U.S. PATENT DOCUMENTS

| 5,428,738 A | 6/1995 | Carter et al. |
| --- | --- | --- |
| 5,608,903 A | 3/1997 | Prasad et al. |
| 5,677,851 A | 10/1997 | Kingdon et al. |
| 5,758,344 A | 5/1998 | Prasad et al. |
| 5,784,560 A | 7/1998 | Kingdon et al. |
| 5,787,175 A | 7/1998 | Carter |
| 5,832,275 A | 11/1998 | Olds |
| 5,832,487 A | 11/1998 | Olds et al. |
| 5,870,564 A | 2/1999 | Jensen et al. |
| 5,878,415 A | 3/1999 | Olds |
| 5,878,419 A | 3/1999 | Carter |
| 5,956,718 A | 9/1999 | Prasad et al. |

(Continued)

*Primary Examiner* — Joseph Greene
(74) *Attorney, Agent, or Firm* — Haynes and Boone, LLP

(57) ABSTRACT

System and method for providing cloud computing services are described. In one embodiment, the system comprises a cloud computing environment comprising resources for supporting cloud workloads, each cloud workload having associated therewith an internal cloud address; and a routing system disposed between external workloads of an external computing environment and the cloud workloads, the routing system for directing traffic from an external cloud address to the internal cloud addresses of the cloud workloads. The routing system comprises a virtual router configured to function as a network address translator ("NAT"); a distributor connected between the virtual router and the cloud workloads; and a distributor registry accessible by the distributor for maintaining information comprising at least one of port mappings, cloud address mappings, and cloud workload configuration information.

14 Claims, 2 Drawing Sheets

(56) References Cited

U.S. PATENT DOCUMENTS

| | | |
|---|---|---|
| 6,055,561 A * | 4/2000 | Feldman et al. ............... 709/200 |
| 6,067,572 A | 5/2000 | Jensen et al. |
| 6,108,619 A | 8/2000 | Carter et al. |
| 6,119,230 A | 9/2000 | Carter |
| 6,185,612 B1 | 2/2001 | Jensen et al. |
| 6,219,652 B1 | 4/2001 | Carter et al. |
| 6,275,819 B1 | 8/2001 | Carter |
| 6,405,199 B1 | 6/2002 | Carter et al. |
| 6,459,809 B1 | 10/2002 | Jensen et al. |
| 6,519,610 B1 | 2/2003 | Ireland et al. |
| 6,539,381 B1 | 3/2003 | Prasad et al. |
| 6,601,171 B1 | 7/2003 | Carter et al. |
| 6,647,408 B1 | 11/2003 | Ricart et al. |
| 6,650,777 B1 | 11/2003 | Jensen et al. |
| 6,697,497 B1 | 2/2004 | Jensen et al. |
| 6,738,907 B1 | 5/2004 | Carter |
| 6,742,035 B1 | 5/2004 | Zayas et al. |
| 6,742,114 B1 | 5/2004 | Carter et al. |
| 6,760,843 B1 | 7/2004 | Carter |
| 6,772,214 B1 | 8/2004 | McClain et al. |
| 6,826,557 B1 | 11/2004 | Carter et al. |
| 6,862,606 B1 | 3/2005 | Major et al. |
| 6,937,574 B1 * | 8/2005 | Delaney et al. ............... 370/254 |
| 6,993,508 B1 | 1/2006 | Major et al. |
| 7,043,555 B1 | 5/2006 | McClain et al. |
| 7,107,538 B1 | 9/2006 | Hinckley et al. |
| 7,152,031 B1 | 12/2006 | Jensen et al. |
| 7,177,922 B1 | 2/2007 | Carter et al. |
| 7,185,047 B1 | 2/2007 | Bate et al. |
| 7,197,451 B1 | 3/2007 | Carter et al. |
| 7,286,977 B1 | 10/2007 | Carter et al. |
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootton et al. |
| 7,506,055 B2 | 3/2009 | McClain et al. |
| 7,552,468 B2 | 6/2009 | Burch et al. |
| 7,562,011 B2 | 7/2009 | Carter et al. |
| 7,831,697 B2 * | 11/2010 | Fukushima ............... 709/223 |
| 2007/0208784 A1* | 9/2007 | Beeston et al. ............... 707/203 |
| 2009/0046728 A1* | 2/2009 | Matthews ............... 370/397 |
| 2010/0088304 A1* | 4/2010 | Jackson ............... 707/706 |

* cited by examiner

SYSTEM AND METHOD FOR REDUCING CLOUD IP ADDRESS UTILIZATION USING A DISTRIBUTOR REGISTRY

CROSS-REFERENCE TO RELATED APPLICATIONS

This application claims the benefit under Title 35, United States Code §119(e) of U.S. Provisional Patent Application No. 61/160,030 filed on Mar. 13, 2009, the disclosure of which is incorporated herein by reference in its entirety. This application is related to the following commonly-assigned, co-pending applications, each of which is also incorporated herein by reference in its entirety:

1. U.S. patent application Ser. No. 12/612,807, issued as U.S. Pat. No. 8,065,395;
2. U.S. patent application Ser. No. 12/612,818;
3. U.S. patent application Ser. No. 12/612,834, issued as U.S. Pat. No. 8,364,842;
4. U.S. patent application Ser. No. 12/612,841, issued as U.S. Pat. No. 8,286,232;
5. U.S. patent application Ser. No. 12/612,882;
6. U.S. patent application Ser. No. 12/612,895;
7. U.S. patent application Ser. No. 12/612,903;
8. U.S. patent application Ser. No. 12/612,925, issued as U.S. Pat. No. 8,516,293;
9. U.S. patent application Ser. No. 12/613,077, issued as U.S. Pat. No. 8,429,716;
10. U.S. patent application Ser. No. 12/613,098; and
11. U.S. patent application Ser. No. 12/197,833

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

With the advent of cloud computing and cloud storage, a challenge exists with respect to IP address usage and the sharing of cryptographic keys between a known and trusted location and the computing cloud.

SUMMARY

One embodiment is a system for providing cloud computing services. The system comprises a cloud computing environment comprising resources for supporting cloud workloads, each cloud workload having associated therewith an internal cloud address; and a routing system disposed between external workloads of an external computing environment and the cloud workloads, the routing system for directing traffic from an external cloud address to the internal cloud addresses of the cloud workloads. The routing system comprises a virtual router configured to function as a network address translator ("NAT"); a distributor connected between the virtual router and the cloud workloads; and a distributor registry accessible by the distributor for maintaining information comprising at least one of port mappings, cloud address mappings, and cloud workload configuration information.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

The embodiments described herein provide a mechanism for providing reduced cloud IP address utilization. To this end, one or more embodiments described herein provide a method and mechanism to enable the use of a single IP address to address many instances within a cloud infrastructure. Additionally, one or more such embodiments provide a method and mechanism to provide the keys necessary to secure traffic and storage in the cloud.

Figure 1:
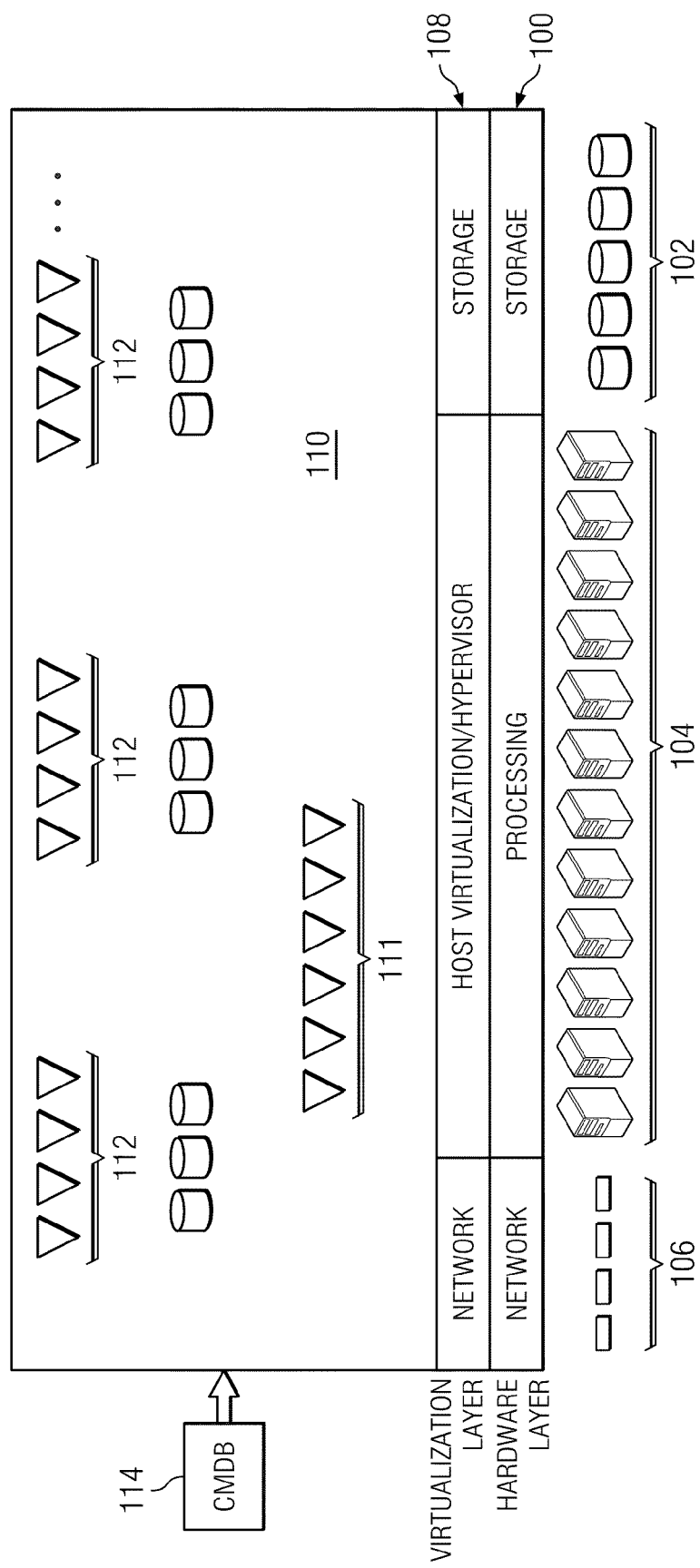
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud services provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud services provider to monitor the health of the cloud, management processes to enable the cloud services provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud services provider may be using standard ITIL practices and may utilize a configuration management database ("CMDB") 114, which affects the entire cloud infrastructure and which describes the practice and policies used for instantiating virtualized workloads and storage.

Figure 2:
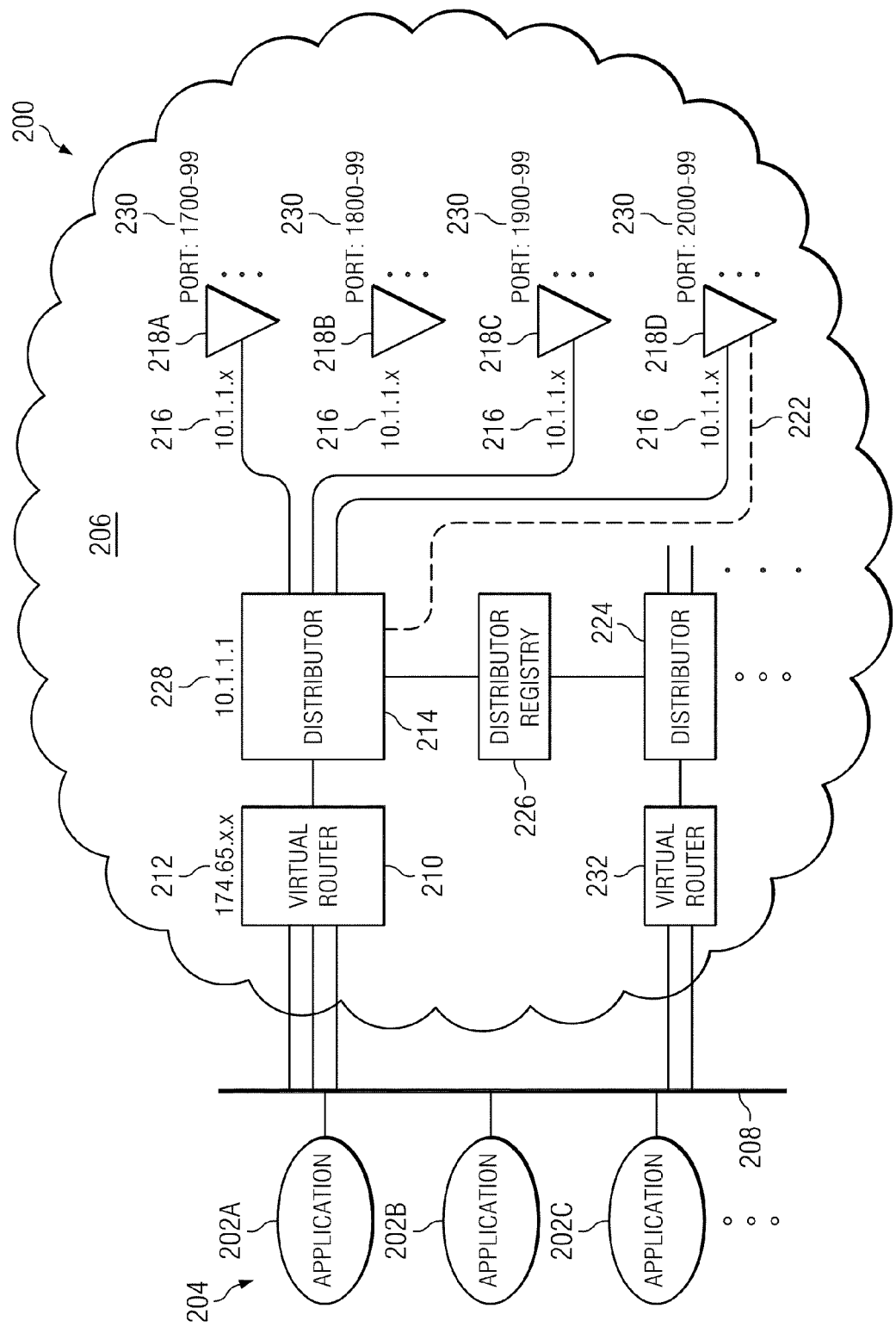
FIG. 2 is a flow diagram of one embodiment of a process for implementing reduced cloud IP address utilization.

FIG. 2 is a flow diagram of one embodiment of a system 200 for providing reduced cloud IP address utilization. As shown in FIG. 2, one or more applications of an enterprise, represented in FIG. 2 by applications 202A-202C, hosted in a known and trusted environment 204 under the control of the enterprise. As will be described, the applications 202A-202C require access to storage and/or processes in a cloud 206; as a result, such storage and/or processes may be disposed in an unknown location and under an unknown trust model. In accordance with one embodiment, as will be described in detail hereinbelow, it is possible to annex portions of the cloud 206 so that the applications 202A-202C can utilize resources disposed within the cloud 206 in the same manner as if they were disposed in a trusted and known location, such as a data center (not shown) of the enterprise.

In the embodiment illustrated in FIG. 2, a secure bridge 208 provides a secure connection between applications 202A-202C and a virtual router 210, which secure connection can be created based upon keys that were previously traded between the provider of the cloud 206 ("the cloud services provider") and the enterprise as is known in the art. The virtual router 210 lies within the infrastructure and under the control of the cloud services provider (IaaS) and as such, the public and/or private keys that the IaaS holds are secured by the IaaS infrastructure, data center security, physical security, and others.

As a result, because the secure bridge 208 and virtual router 210 possess mutually shared keys or mutually shared parts of key pairs, a secured connection can be created between the applications 202A-202C and the virtual router 210 via the secure bridge 208 as described in detail in U.S. patent application Ser. No. 12/612,841, issued as U.S. Pat. No. 8,286,232, which has been incorporated by reference in its entirety. In the embodiment shown in FIG. 2, each application 202A-202C has access to the keys mentioned hereinabove in connection with the secure bridge 208 such that endpoint security from the applications 202A-202C to an external address 212, shown in FIG. 2 as "174.65.x.x", via the router 210 can exist without the need of the secure bridge 208.

As previously noted, the virtual router 210 lies within the infrastructure of the cloud services provider and acts as a Network Address Translator ("NAT") to workloads within a specific domain. In a representative embodiment, the IP address is a private addresses, such as a 10-net, so that only the single external address 212 is necessary to access the cloud processes, as will be described. In such a case, as shown in FIG. 2, a distributor 214 forwards traffic from the external address 212 to internal addresses 216 (e.g., "10.1.1.x") so that only one external address needs to be associated with the processes within the cloud 206. In one embodiment, the foregoing may be accomplished by matching port ranges to specific workloads, represented by workloads 218A-218D, so that if auto load balancing of each of the workloads is required, the port ranges can enable a distinction to be made between the workloads operating within the cloud 206 via a given 10-net.

In one embodiment, the distributor 214 maintains all port mappings in a distributor registry 226 so that requests from applications 202A-202C can be sent to the appropriate one of the workloads 218A-218D. Information may be split between the distributor registry 226 and the secure bridge 208 and further information, such as tokens from a Representational State Transfer ("REST") call can be maintained with the port mapping such that better information can be provided during the mapping process.

In the embodiment shown in FIG. 2, the internal addresses 216 may be partitioned such that the "x" therein represents some kind of subnet IP address grouping (e.g., 10.1.1.10-20). Accordingly, instead of using a port, IP addresses may be used within the address space. In this embodiment, the distributor 214 may map a single external address to within the 10-net address space so that it is multiplexed into various types of workloads and or storage. In the illustrated embodiment, storage is also protected this way by allowing one of the workloads, such as the workload 218D, to hold keys and to process traffic for storage in the cloud 206. As a result, the storage can be encrypted and decrypted on-the-fly as needed by either an internal-to-the-cloud or external-to-the-cloud process.

Once the secure connection between the applications 202A-202C and the distributor 214 is established based on attestation by the virtual router 210 to the fact that the distributor has not changed and therefore may be trusted in its process model, cryptographic keys may be transmitted from the applications across to the distributor so that a process can receive keys, as represented in FIG. 2 by a dashed line 222. This process ensures that storage or other content and traffic can be protected via keys received external to the cloud 206. This is significant because it allows for the keys to be stored in a location other than the cloud 206, thereby providing a layer of protection generally not afforded in a public location such as a cloud computing environment.

It will be recognized that, as illustrated in FIG. 2, an additional distributor 224 may be provided. In such cases, the distributor registry 226 enables distribution address spaces to be properly managed. Each of the workloads 218A-218D communicates to with the distributor 214 via an address, such as, for example, a 10-net address 228, that is communicated to the workloads when they are started up so that any new processes that are initiated due to load balancing issues, load expansion issues, load contraction issues and the like can communicate their local address 216 to the distributor 214. It should be noted that what is communicated to the workloads may be the address of the distributor 214 or a token, such as a DNS name, that may be used by the workload to lookup the address of the distributor 214. In any event, it will be noted that the communicated address is one that is not hard-wired in the system; it is either provided as described or discovered via token dereferencing in a manner well known in the art. As a result, through implementation of some predetermined policy, the communicated local address and its associated port range 230 can be logged in to the distributor registry 226 so that the addresses can be correctly maintained according to address, port, and workload type.

The distributor 214 also provides configuration information to the workloads 218A-218D so that configuration information can be normalized and provided to new workloads that are being brought up as a result of load expansion or contraction. Additionally, the configuration described hereinabove is provided external to the cloud 206 via the same mechanism as was discussed with key distribution. This mechanism provides for a simpler method of keeping the workloads 218A-218D up to date and the startup or boot configuration normalized.

One embodiment is implemented using one or more embodiments described in U.S. patent application Ser. No. 12/197,833 (hereinafter the "'833 application), incorporated by reference hereinabove to find, analyze, and qualify clouds, such as the cloud 206, so that the required infrastructure for allowing the deployment of everything within the cloud 206 will function correctly. The embodiment described in the '833 application also keeps track of reputation of all clouds so that the best price, performance, stability, etc., can be selected for a deployment within the cloud.

In an alternative embodiment, the distributor 214 can reside external to the cloud 206 or in a different cloud. In this case, the virtual router 210 must attest to the validity of the workloads 218A-218D so that it is attested that no changes have been made. In the illustrated embodiment, each of the workloads 218A-218D has a secure connection through the virtual router 210 to the applications 202A-202C so that the annexation is still valid. It will be recognized, however, that this embodiment requires more traffic over the network.

In one embodiment, additional virtual routers, such as a virtual router 232, may be added. In this embodiment, an L4 switch or some other load-balancing mechanism (not shown) may be provided in a known manner to distribute traffic between the external addresses connected to the virtual routers 210, 232. In another embodiment, the information from the distributor registry 226 is available to the workloads 218A-218D such that the information provided by the distributor registry provides the workloads with information necessary to perform clustering, remedial clustering, and/or other types of cooperative computing and storage management.

In one embodiment, the secure bridge 208 may be replaced by a secure connection implemented using a pair of cryptographic keys held by both the trusted environment/enterprise 204 and the cloud 206.

It will be recognized that various ones of the elements and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for providing cloud computing services, the system comprising:
   a cloud computing environment comprising a cloud infrastructure including a hardware layer having storage assets, processing assets and network assets for supporting cloud workloads and a routing system, each cloud workload having associated therewith an internal cloud address, wherein the routing system is disposed within the cloud infrastructure of the cloud computing environment, the routing system comprising:
      a virtual router disposed within a first cloud of the cloud computing environment and configured to function as a network address translator ("NAT");
      a distributor disposed within a second cloud of the cloud computing environment different from the first cloud and connected between the virtual router and the cloud workloads, wherein the distributor receives cryptographic keys from the external workloads based on attestation by the virtual router of the first cloud and uses the cryptographic keys to establish a secure connection to route traffic between the external workloads and the cloud workloads; and
      a distributor registry accessible by the distributor for maintaining information comprising port mappings, cloud address mappings, and cloud workload configuration information, wherein each of the cloud workloads communicates information comprising its internal cloud address and at least one port designation to the distributor, which logs the information in the distributor registry.

2. The system of claim 1 wherein the distributor maps at least one port designation to the cloud workloads via the internal cloud addresses.

3. The system of claim 1 further comprising a secure communications channel disposed between the cloud computing environment and the external computing environment.

4. The system of claim 1 wherein the information maintained by the distributor registry is available to the cloud workloads for enabling performance of at least one of clustering, remedial clustering, and cooperative computing and storage management operations.

5. The system of claim 1 wherein the routing system further comprises:
   a plurality of virtual routers; and
   a plurality of distributors each connected to a respective one of the plurality of virtual routers;
   wherein the distributor registry is accessible by each one of the plurality of distributors.

6. A system for providing cloud computing services, the system comprising:
   a cloud computing environment comprising a cloud infrastructure including a hardware layer having storage assets and processing assets for supporting cloud workloads each having associated therewith an internal cloud address; and
   a routing system disposed within the cloud infrastructure of the cloud computing environment, the routing system comprising:
      a virtual router disposed within a first cloud of the cloud computing environment and configured to function as a network address translator ("NAT");
      a distributor disposed within a second cloud of the cloud computing environment different from the first cloud and connected between virtual router of the first cloud and the cloud workloads, wherein the distributor of the second cloud receives cryptographic keys from the external workloads based on attestation by the virtual router of the first cloud; and a distributor registry accessible by the distributor for maintaining information comprising at least one of port mappings, address mappings, and configuration information for each of the cloud workloads, wherein the distributor of the second cloud uses the cryptographic keys to establish a secure connection to route traffic between the external workloads and the cloud workloads, and wherein each of the cloud workloads communicates information comprising its internal address and at least one port designation to the distributor, which logs the information in the distributor registry.

7. The system of claim 6 wherein the distributor maps at least one port designation to the cloud workloads via the internal addresses.

8. The system of claim 6 wherein the information maintained by the registry means is available to the cloud workloads for enabling performance of at least one of clustering, remedial clustering, and cooperative computing and storage management operations.

9. The system of claim 6 wherein the routing system further comprises:

a plurality of virtual routers; and a plurality of distributors each connected to a respective one of the plurality of virtual routers;

wherein the distributor registry is accessible by each one of the plurality of distributors.

10. A method of providing cloud computing services, the method comprising:

providing a cloud computing environment comprising a first cloud, a second cloud, and resources for supporting cloud workloads of the first cloud, each cloud workload of the first cloud having associated therewith an internal address; and routing traffic between external workloads of an external computing environment to the cloud workloads of the first cloud, the routing comprising directing traffic from an external address to the internal cloud addresses and further comprising:

providing a virtual router disposed within the first cloud and configured to function as a network address translator ("NAT");

providing a distributor disposed within the second cloud and connected between the virtual router and the cloud workloads of the first cloud, wherein the distributor of the second cloud establishes secure connections with the external workloads based on attestation by the virtual router of the first cloud to the validity of the distributor of the second cloud, and wherein the distributor of the second cloud establishes secure connections with the cloud workloads of the first cloud based on attestation by the virtual router of the first cloud to the validity of the cloud workloads of the first cloud;

providing a distributor registry accessible by the distributor of the second cloud for maintaining at least one of port mappings, address mappings, and cloud workload configuration information.

11. The method of claim 10 further comprising mapping at least one port designation to the cloud workloads via the internal cloud addresses.

12. The method of claim 10 further comprising establishing a secure communications channel between the cloud computing environment and the external computing environment.

13. The method of claim 10 further comprising making available to the cloud workloads the information maintained by the distributor registry for enabling the cloud workloads to perform at least one of clustering, remedial clustering, and cooperative computing and storage management operations.

14. The method of claim 10 wherein the routing further comprises:

providing a plurality of virtual routers;

providing a plurality of distributors each connected to a respective one of the virtual routers;

wherein the distributor registry is accessible by each one of the plurality of distributors.

* * * * *